US012451637B2

(12) United States Patent
Chen

(10) Patent No.: US 12,451,637 B2
(45) Date of Patent: Oct. 21, 2025

(54) CONDUCTIVE TERMINAL, ELECTRICAL CONNECTOR, AND ELECTRICAL CONNECTOR ASSEMBLY WITH IMPROVED ELASTIC PIECES

(71) Applicant: Xuancheng Luxshare Precision Industry Co., Ltd, Xuancheng (CN)

(72) Inventor: Xiaoming Chen, Xuancheng (CN)

(73) Assignee: XUANCHENG LUXSHARE PRECISION INDUSTRY CO., LTD, Xuancheng (CN)

( * ) Notice: Subject to any disclaimer, the term of this patent is extended or adjusted under 35 U.S.C. 154(b) by 376 days.

(21) Appl. No.: 18/106,268

(22) Filed: Feb. 6, 2023

(65) Prior Publication Data

US 2024/0014587 A1 Jan. 11, 2024

(30) Foreign Application Priority Data

Jul. 6, 2022 (CN) ........................ 202210788624.9

(51) Int. Cl.
*H01R 13/15* (2006.01)
*H01R 4/18* (2006.01)
(Continued)

(52) U.S. Cl.
CPC ............. *H01R 13/15* (2013.01); *H01R 4/184* (2013.01); *H01R 4/186* (2013.01); *H01R 13/113* (2013.01);
(Continued)

(58) Field of Classification Search
CPC ........ H01R 13/15; H01R 4/184; H01R 4/186; H01R 13/113; H01R 13/40;
(Continued)

(56) References Cited

U.S. PATENT DOCUMENTS 7,591,680 B2 * 9/2009 Zhang ............... H01R 13/6582 439/607.17
2014/0127954 A1 5/2014 Ando et al.
(Continued)

FOREIGN PATENT DOCUMENTS

CN 203491431 U 3/2014
CN 106033852 A 10/2016
(Continued)

*Primary Examiner* — Justin M Kratt
(74) *Attorney, Agent, or Firm* — Birch, Stewart, Kolasch & Birch, LLP

(57) ABSTRACT

A conductive terminal includes a first fixing portion, a first mating portion, a second fixing portion and a second mating portion. The second mating portion and the first mating portion are arranged side by side along a first direction. The first mating portion includes a first elastic piece extending along a second direction. The first elastic piece includes a first elastic contact portion. The second mating portion includes a second elastic piece. The second elastic piece includes a second elastic contact portion. The first elastic contact portion extends along a first arc-shaped surface. The second elastic contact portion extends along a second arc-shaped surface. Protruding directions of the first arc-shaped surface and the second arc-shaped surface are opposite to each other along the first direction. An electrical connector and an electrical connector assembly having the conductive terminal are disclosed.

20 Claims, 20 Drawing Sheets

(51) Int. Cl.

| | |
|---|---|
| ***H01R 13/11*** | (2006.01) |
| ***H01R 13/40*** | (2006.01) |
| ***H01R 13/422*** | (2006.01) |
| ***H01R 13/6581*** | (2011.01) |
| *H01R 13/05* | (2006.01) |
| *H01R 13/10* | (2006.01) |
| *H01R 13/17* | (2006.01) |
| *H01R 13/18* | (2006.01) |
| *H01R 13/187* | (2006.01) |
| *H01R 13/42* | (2006.01) |
| *H01R 13/426* | (2006.01) |

(52) U.S. Cl.

CPC ......... *H01R 13/40* (2013.01); *H01R 13/4223* (2013.01); *H01R 13/6581* (2013.01); *H01R 4/18* (2013.01); *H01R 4/183* (2013.01); *H01R 4/185* (2013.01); *H01R 13/055* (2013.01); *H01R 13/10* (2013.01); *H01R 13/11* (2013.01); *H01R 13/17* (2013.01); *H01R 13/18* (2013.01); *H01R 13/187* (2013.01); *H01R 13/42* (2013.01); *H01R 13/422* (2013.01); *H01R 13/426* (2013.01)

(58) Field of Classification Search

CPC .. H01R 13/4223; H01R 13/6581; H01R 4/18; H01R 4/183; H01R 4/185; H01R 13/055; H01R 13/10; H01R 13/11; H01R 13/17; H01R 13/18; H01R 13/187; H01R 13/42; H01R 13/422; H01R 13/426; H01R 13/74

See application file for complete search history.

(56) References Cited

U.S. PATENT DOCUMENTS

| | | | | |
|---|---|---|---|---|
| 2022/0209450 | A1* | 6/2022 | Jung .................... | H01R 13/187 |
| 2023/0378676 | A1* | 11/2023 | Patil .................... | H01R 13/112 |
| 2025/0070495 | A1 | 2/2025 | Chen | |

FOREIGN PATENT DOCUMENTS

| | | | |
|---|---|---|---|
| CN | 206685570 | U | 11/2017 |
| CN | 208401098 | U | 1/2019 |
| CN | 217956175 | U | 12/2022 |
| JP | 2014-75332 | A | 4/2014 |
| JP | 2019-192443 | A | 10/2019 |

* cited by examiner

CONDUCTIVE TERMINAL, ELECTRICAL CONNECTOR, AND ELECTRICAL CONNECTOR ASSEMBLY WITH IMPROVED ELASTIC PIECES

CROSS-REFERENCE TO RELATED APPLICATION

This patent application claims priority of a Chinese Patent Application No. 202210788624.9, filed on Jul. 6, 2022 and titled "Conductive terminal, electrical connector, and electrical connector assembly", the entire content of which is incorporated herein by reference.

TECHNICAL FIELD

The present disclosure relates to a conductive terminal, an electrical connector and an electrical connector assembly, which belongs to a technical field of power connectors.

BACKGROUND

Power connector assemblies in the related art are used to transmit electric current. The power connector assembly typically includes a plug connector and a receptacle connector. The receptacle connector includes a receptacle terminal and an adapter spring assembled and fixed to the receptacle terminal. The plug connector includes a plug terminal. The plug terminal is inserted into the adapter spring to realize the connection with the receptacle terminal.

However, due to the limitation of the assembly process, there is a certain gap between the adapter spring and the receptacle terminal. The high-frequency vibration during the application of the receptacle terminal and the adapter spring will cause the adapter spring and the plug terminal to repeatedly rub at a small distance. This leads to the wear of the contacts of the plug terminal or the adapter spring, which reduces the current-carrying performance of the terminal, fails the electrical performance, and even causes safety hazards.

SUMMARY

An object of the present disclosure is to provide a conductive terminal, an electrical connector and an electrical connector assembly with reliable structure.

In order to achieve the above object, the present disclosure adopts the following technical solution: a conductive terminal, including: a first fixing portion; a first mating portion connected with the first fixing portion; a second fixing portion, the second fixing portion and the first fixing portion being arranged side by side along a first direction; and a second mating portion connected with the second fixing portion, the second mating portion and the first mating portion being arranged side by side along the first direction; wherein the first mating portion includes a first elastic piece extending along a second direction, the first elastic piece includes a first elastic contact portion protruding from the first fixing portion along the first direction; the second mating portion includes a second elastic piece, the second elastic piece includes a second elastic contact portion protruding from the second fixing portion along the first direction; and the first elastic contact portion extends along a first arc-shaped surface, the second elastic contact portion extends along a second arc-shaped surface, and protruding directions of the first arc-shaped surface and the second arc-shaped surface are opposite to each other along the first direction.

In order to achieve the above object, the present disclosure adopts the following technical solution: an electrical connector, including: an insulating body including a mating slot; and the conductive terminal, the first fixing portion and the second fixing portion being fixed in the insulating body, the first mating portion and the second mating portion extending into the mating slot.

In order to achieve the above object, the present disclosure adopts the following technical solution: an electrical connector assembly, including: the electrical connector; and a mounting plate; wherein free ends of the claws extend through the mounting plate and abut against a back surface of the mounting plate.

Compared with the prior art, in the present disclosure, the first mating portion is provided with the first elastic piece, the first elastic piece includes a first elastic contact portion protruding from the first fixing portion along the first direction; the second mating portion is provided with a second elastic piece, the second elastic piece includes a second elastic contact portion protruding from the second fixing portion along the first direction; the first elastic contact portion extends along the first arc-shaped surface, the second elastic contact portion extends along the second arc-shaped surface, and protruding directions of the first arc-shaped surface and the second arc-shaped surface are opposite to each other along the first direction. Therefore, the elastic contact portions are formed on the mating portion, thereby omitting the adapter spring, and improving the structural reliability and safety.

DETAILED DESCRIPTION

Figure 1:
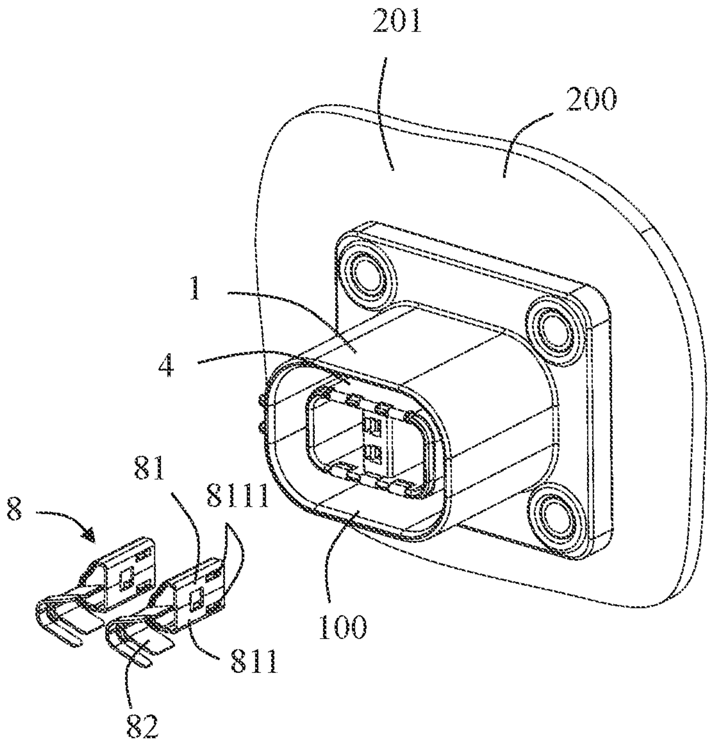
FIG. 1 is a partially exploded perspective view of a connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
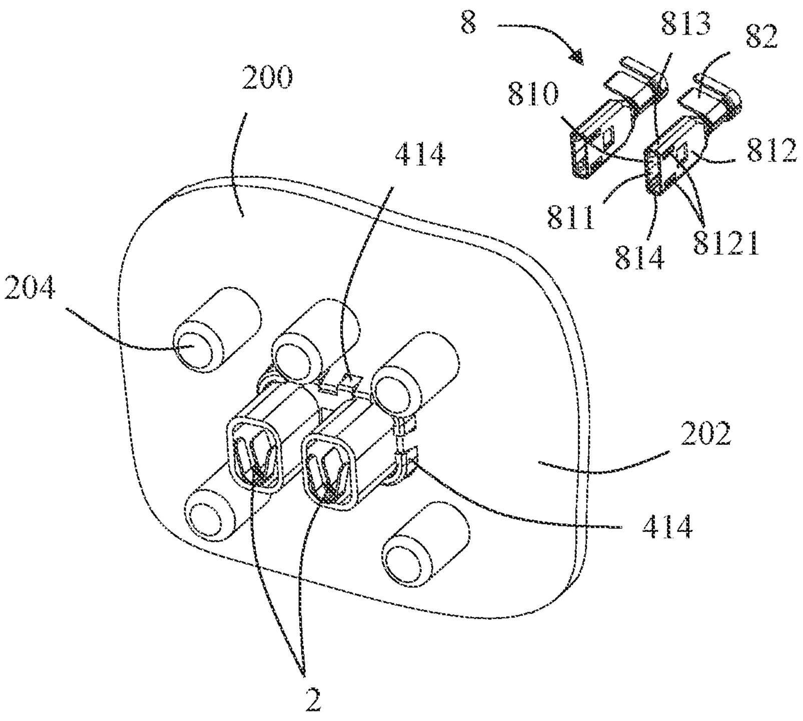
FIG. 2 is a partial perspective exploded view of FIG. 1 from another angle.

Referring to FIG. 1 and FIG. 2, the present disclosure discloses an electrical connector assembly including an electrical connector assembly and a mating connector. In the illustrated embodiment of the present disclosure, the electrical connector assembly includes a mounting plate 200, an electrical connector 100 (e.g., a plug connector) mounted on the mounting plate 200, and a fixing member (e.g., a screw) for fixing the electrical connector 100 to the mounting plate 200. A mating connector (e.g., a receptacle connector) is used for mating with the electrical connector 100 to achieve conduction (e.g., power transmission).

Referring to FIG. 1 and FIG. 2, the receptacle connector includes a mating insulating body (not shown) and a plurality of mating conductive terminals 8 installed in the mating insulating body. Each of the mating conductive terminals 8 includes a cylindrical contact portion 81 and a riveting portion 82 for fixing with a mating cable (not shown). The contact portion 81 includes a first contact wall 811, a second contact wall 812 opposite to the first contact wall 811, a first connecting wall 813 connecting one end of the first contact wall 811 and one end of the second contact wall 812, a second connecting wall 814 connecting another end of the first contact wall 811 and another end of the second contact wall 812, and a mating cavity 810 jointly enclosed by the first contact wall 811, the second contact wall 812, the first connecting wall 813 and the second connecting wall 814, for receiving a mating terminal. The first contact wall 811 is provided with a plurality of first abutting protruding ribs 8111 protruding into the mating cavity 810. The second contact wall 812 is provided with a plurality of second abutting protruding ribs 8121 protruding into the mating cavity 810. The first abutting protruding ribs 8111 and the second abutting protruding ribs 8121 are configured to abut against the mating terminal so as to improve contact reliability.

The mounting plate 200 includes a front side 201, a back side 202, a mounting through hole 203 extending through the front side 201 and the back side 202, and a plurality of mounting posts 204 disposed on the back surface 202. The mounting through hole 203 is surrounded by the mounting posts 204 to improve structural reliability.

Figure 3:
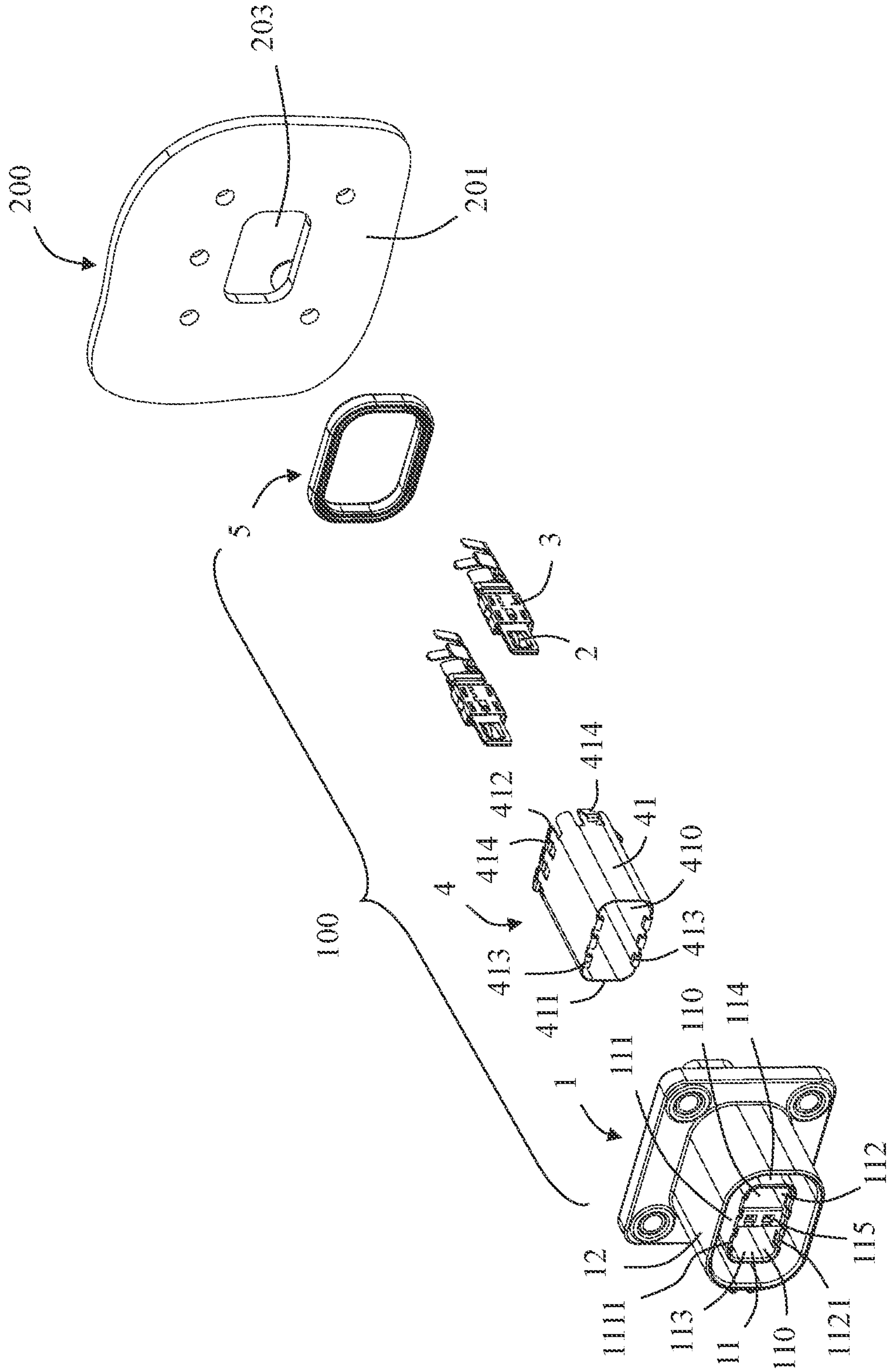
FIG. 3 is a partial perspective exploded view of an electrical connector assembly of FIG. 1.
Figure 4:
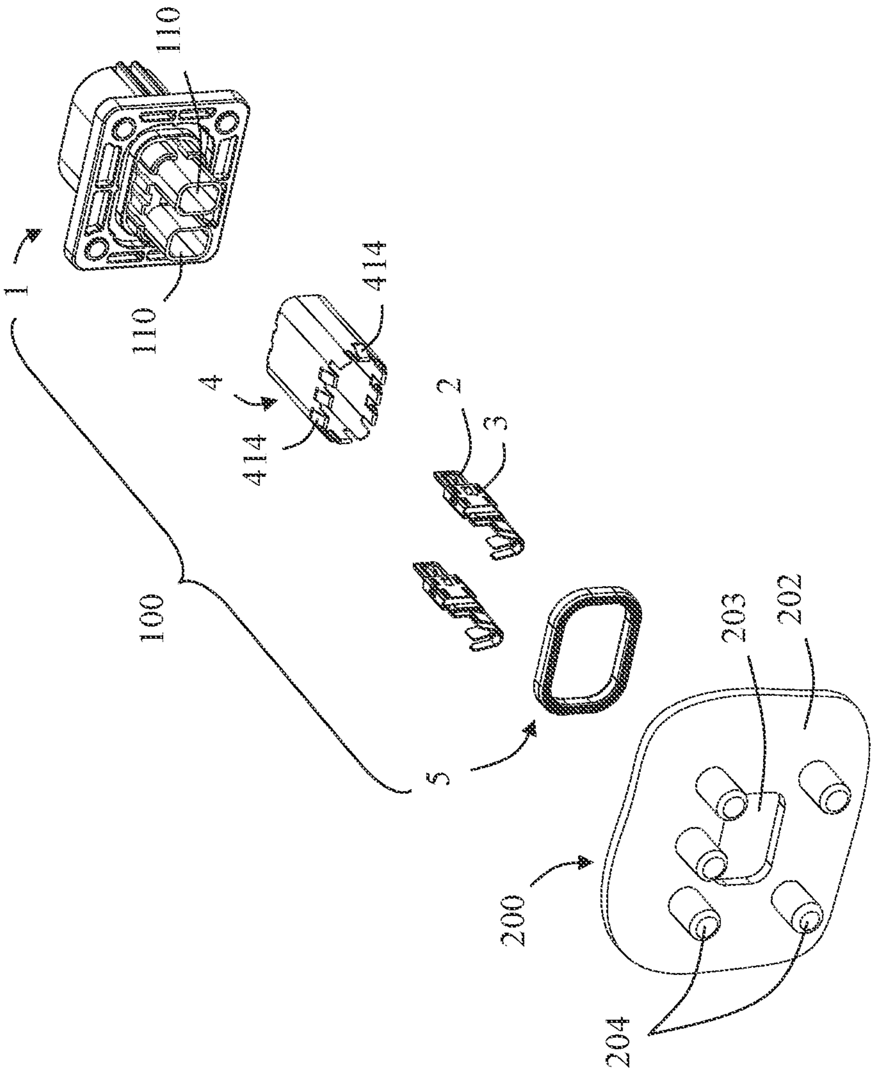
FIG. 4 is a partial perspective exploded view FIG. 3 from another angle.
Figure 5:
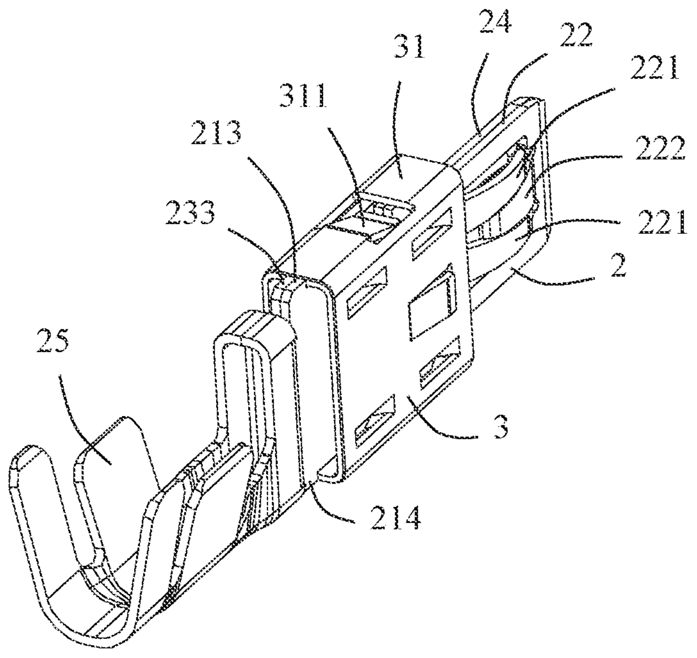
FIG. 5 is a perspective view of a mutual positional relationship between a conductive terminal and a retaining terminal in FIG. 4 after assembly.
Figure 6:
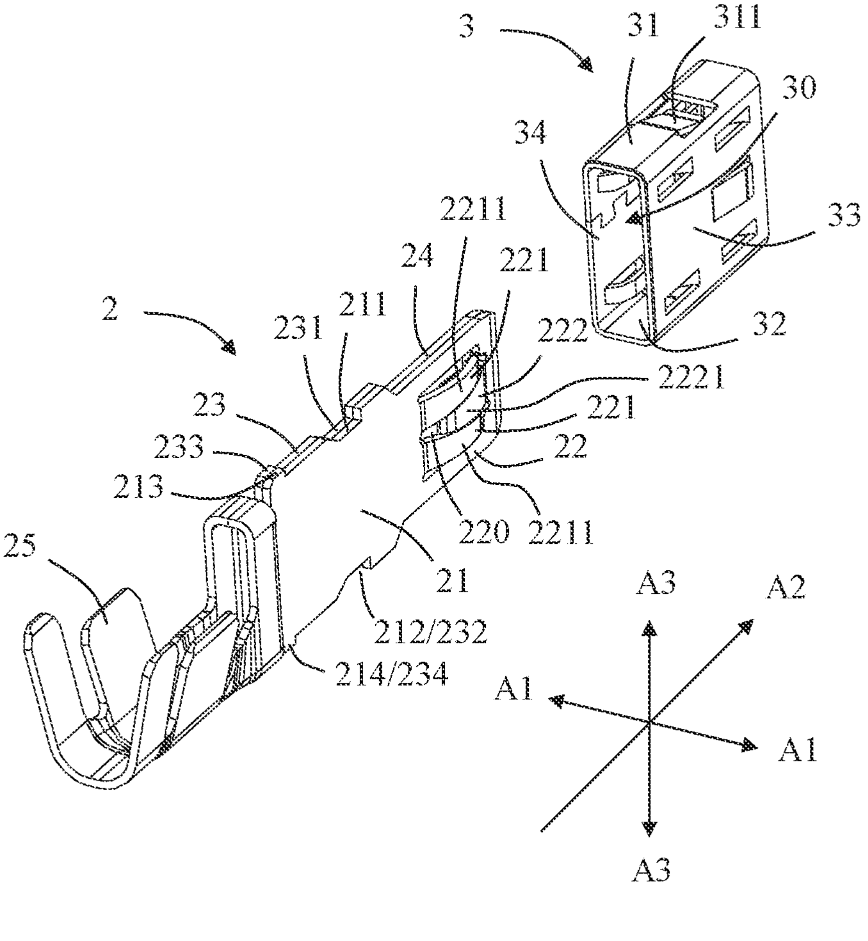
FIG. 6 is an exploded view of FIG. 5.
Figure 7:
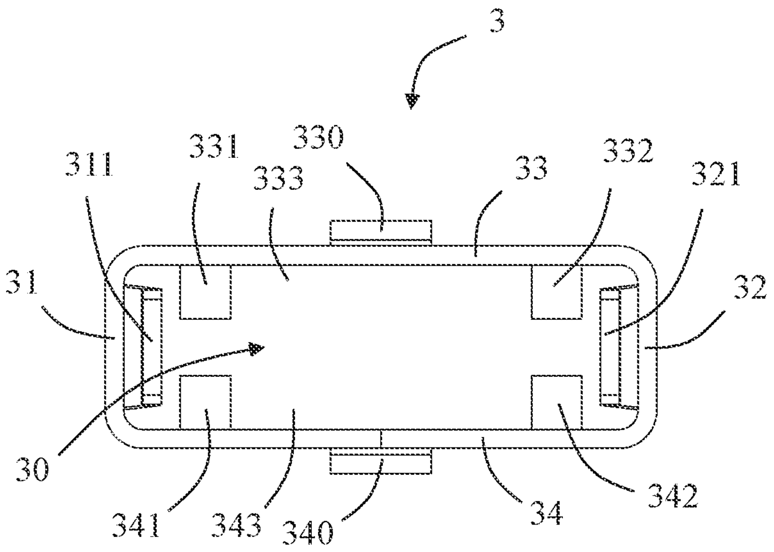
FIG. 7 is a front view of the retaining terminal.

Referring to FIG. 3 and FIG. 4, the electrical connector 100 includes an insulating body 1, a plurality of conductive terminals 2 installed in the insulating body 1, a plurality of retaining terminals 3 fixed in the insulating body 1 and allowing the conductive terminals 2 to be installed therethrough, a metal shielding sleeve 4 mounted to the insulating body 1, and a sealing ring 5 mounted to the insulating body 1.

The insulating body 1 includes a ring-shaped plug portion 11 located in a middle and a casing 12 disposed around a periphery of the plug portion 11. The plug portion 11 is provided with a plurality of mating slots 110. The mating slots 110 extend through the plug portion 11 along its extending direction. In the embodiment shown in the present disclosure, the number of the mating slots 110 is two. The plug portion 11 includes a partition portion 115 located in the middle of the two mating slots 110. The plug portion 11 includes a first side wall portion 111, a second side wall portion 112 opposite to the first side wall portion 111, a third side wall portion 113 connecting one end of the first side wall portion 111 and one end of the second side wall portion, and a fourth side wall portion 114 connecting another end of the first side wall portion 111 and another end of the second side wall portion. The first side wall portion 111 is provided with a plurality of first notches 1111 which communicate with the mating slot 110 and are located at a front end of the first side wall portion 111. The second side wall portion 112 is provided with a plurality of second notches 1121 which communicate with the mating slot 110 and located at a front end of the second side wall portion 111. In the embodiment shown in the present disclosure, the plurality of first notches 1111 and the plurality of second notches 1121 are symmetrically disposed on two sides of the mating slot 110.

The metal shielding sleeve 4 is sleeved on the plug portion 11 to improve the shielding effect. The metal shielding sleeve 4 includes a main body portion 41. The main body portion 41 includes a first end 411, a second end 412 opposite the first end 411, and an accommodating space 410 extending through the first end 411 and the second end 412. The metal shielding sleeve 4 includes a plurality of hooks 413 which protrude inwardly from the first end 411 of the main body portion 41 into the accommodating space 410 and extend toward the second end 412. The hooks 413 are fixed in the corresponding first notches 1111 and the second notches 1121. The metal shielding sleeve 4 further includes a plurality of claws 414 which protrude outward from the second end 412 of the main body portion 41. The claws 414 extend beyond the accommodating space 410, and are turned and bent toward the first end 411. The plurality of claws 414 extend beyond the insulating body 1. When the electrical connector 100 is mounted on the mounting plate 200, the electrical connector 100 passes through the mounting through hole 203, and at this time, the plurality of claws 414 are pressed and deformed inwardly. After the electrical connector 100 is installed in place, the plurality of claws 414 pass through the mounting plate 200. At this time, the plurality of claws 414 release the pressing force and deform outward. Free ends of the plurality of claws 414 can just abut against the back surface 202 of the mounting plate 200 to prevent the electrical connector 100 from falling off the mounting plate 200.

Referring to FIG. 5 to FIG. 20, the conductive terminal 2 includes a first fixing portion 21 fixed in the insulating body 1, a first mating portion 22 connected with the first fixing portion 21, a second fixing portion 23 fixed in the insulating body 1, a second mating portion 24 connected with the second fixing portion 23, and a cable riveting portion 25 connected with the first fixing portion 21 and the second fixing portion 23. The second fixing portion 23 and the first fixing portion 21 are arranged side by side along a first direction A1-A1. The second mating portion 24 and the first mating portion 22 are arranged side by side along the first direction A1-A1. The first mating portion 22 and the second mating portion 24 extend into the mating slot 110. In the embodiment shown in the present disclosure, an extending direction of the conductive terminal 2 has a guiding function, so that the conductive terminal 2 is not easily deformed during use.

The first fixing portion 21 is in the shape of a flat plate. The first fixing portion 21 includes a first locking groove 211 on one side (e.g., a top side), a second locking groove 212 on another side (e.g., a bottom side), a first limiting block 213 located at a rear end of the first locking groove 211, and a second limiting block 214 located at a rear end of the second locking groove 212.

The second fixing portion 23 is in the shape of a flat plate. The second fixing portion 23 includes a third locking groove 231 on one side (e.g., a top side), a fourth locking groove 232 on another side (e.g., a bottom side), a third limiting block 233 located at a rear end of the third locking groove 231, and a fourth limiting block 234 located at a rear end of the fourth locking groove 232.

In the embodiment shown in the present disclosure, the first fixing portion 21 and the second fixing portion 23 are at least partially abutted against each other along the first direction A1-A1 to improve structural strength and facilitate transmission of high current. The first locking groove 211 is in alignment with the third locking groove 231 to jointly form an upper locking groove. The second locking groove 212 is in alignment with the fourth locking groove 232 to jointly form a lower locking groove.

The first mating portion 22 includes a first elastic piece 221 extending along the second direction A2 and a third elastic piece 222 extending along a direction opposite to the second direction A2. In the embodiment shown in the present disclosure, the number of the first elastic pieces 221 is two. The first mating portion 22 includes a first space 220 located between the two first elastic pieces 221 along a third direction A3-A3. The third elastic piece 222 extends into the first space 220. In the embodiment shown in the present disclosure, the second direction A2 is perpendicular to the first direction A1-A1. The third direction A3-A3 is perpendicular to the first direction A1-A1 and the second direction A2. The first space 220 is substantially V-shaped. Correspondingly, the third elastic piece 222 is provided with a first inclined side 222*a* and a second inclined side 222*b*.

In the illustrated embodiment of the present disclosure, the first elastic piece 221 includes a first elastic contact portion 2211 protruding from the first fixing portion 21 along the first direction A1-A1. The first elastic contact portion 2211 extends along the first arc-shaped surface. The third elastic piece 222 and the first elastic piece 221 at least partially overlap along the third direction A3-A3. The third elastic piece 222 includes a third elastic contact portion 2221 protruding from the first fixing portion 21 along the first direction A1-A1. The third elastic contact portion 2221 extends along the first arc-shaped surface. In other words, referring to FIG. 10 and FIG. 11, the first elastic contact portion 2211 and the third elastic contact portion 2221 have the same arc. In this way, the first elastic piece 221 and the third elastic piece 222 can be held with each other and are not easily deformed; and the strokes of the two are consistent. When the first elastic piece 221 and the third elastic piece 222 are inserted into the mating cavity 810 of a mating conductive terminal 8, the contact performance can be simultaneously achieved, and the insertion stroke is shorter.

Figure 9:
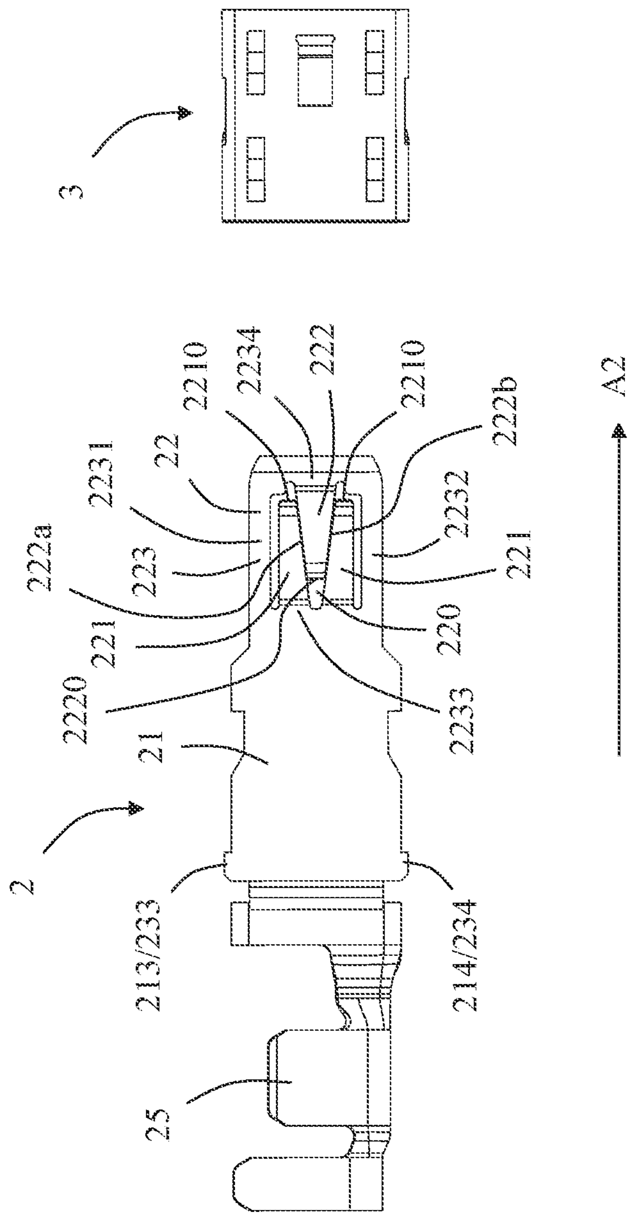
FIG. 9 is a right side view of the conductive terminal and the retaining terminal in FIG. 6.

Referring to FIG. 9, in the embodiment shown in the present disclosure, the first mating portion 22 includes a first frame portion 223. The first frame portion 223 includes a first wall portion 2231, a second wall portion 2232 opposite to the first wall portion 2231, a first connecting portion 2233 connecting one end of the first wall portion 2231 and one end of the second wall portion 2232, and a second connecting portion 2234 connecting another end of the first wall portion 2231 and another end of the second wall portion 2232. The first elastic piece 221 extends from the first connecting portion 2233 toward the second connecting portion 2234. The third elastic piece 222 extends from the second connecting portion 2234 toward the first connecting portion 2233. The first elastic piece 221 includes a first free end 2210 adjacent to the second connecting portion 2234. The third elastic piece 222 includes a third free end 2220 adjacent to the first connecting portion 2233. Both the first free end 2210 and the third free end 2220 are moveable along the first direction A1-A1 in the first frame portion 223 due to abutment with the mating conductive terminal 8.

In the embodiment shown in the present disclosure, the first elastic piece 221 and the third elastic piece 222 are manufactured by tearing materials. Therefore, within the same area, the present disclosure can arrange more elastic pieces, thereby increasing the current carrying area and improving the current transmission capacity; or the present disclosure can save space under the condition of the same number of elastic pieces.

The second mating portion 24 includes a second elastic piece 241 extending along the second direction A2 and a fourth elastic piece 242 extending along a direction opposite to the second direction A2. In the embodiment shown in the present disclosure, there are two second elastic pieces 241. The second mating portion 24 includes a second space 240 located between the two second elastic pieces 241 along the third direction A3-A3. The fourth elastic piece 242 extends into the second space 240. In the embodiment shown in the present disclosure, the second space 240 is substantially V-shaped. Correspondingly, the fourth elastic piece 242 is provided with a third inclined side 242*a* and a fourth inclined side 242*b*.

Figure 10:
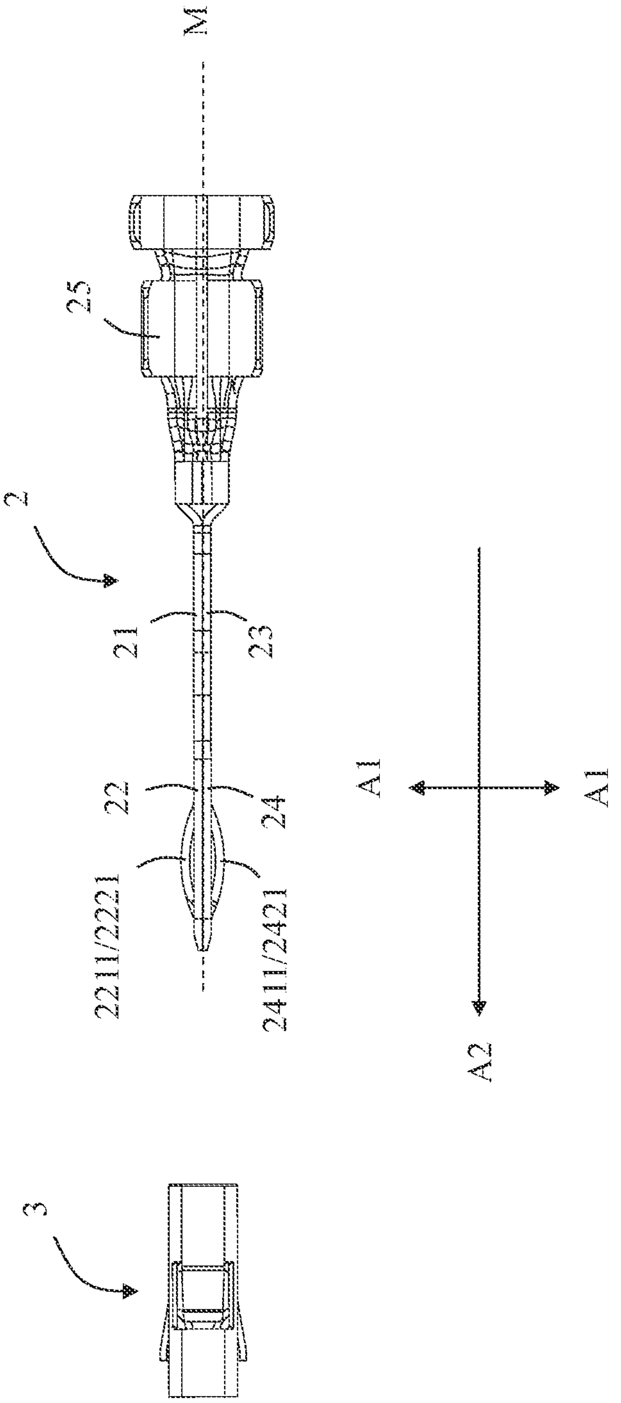
FIG. 10 is a top view of the conductive terminal and the retaining terminal in FIG. 6.
Figure 11:
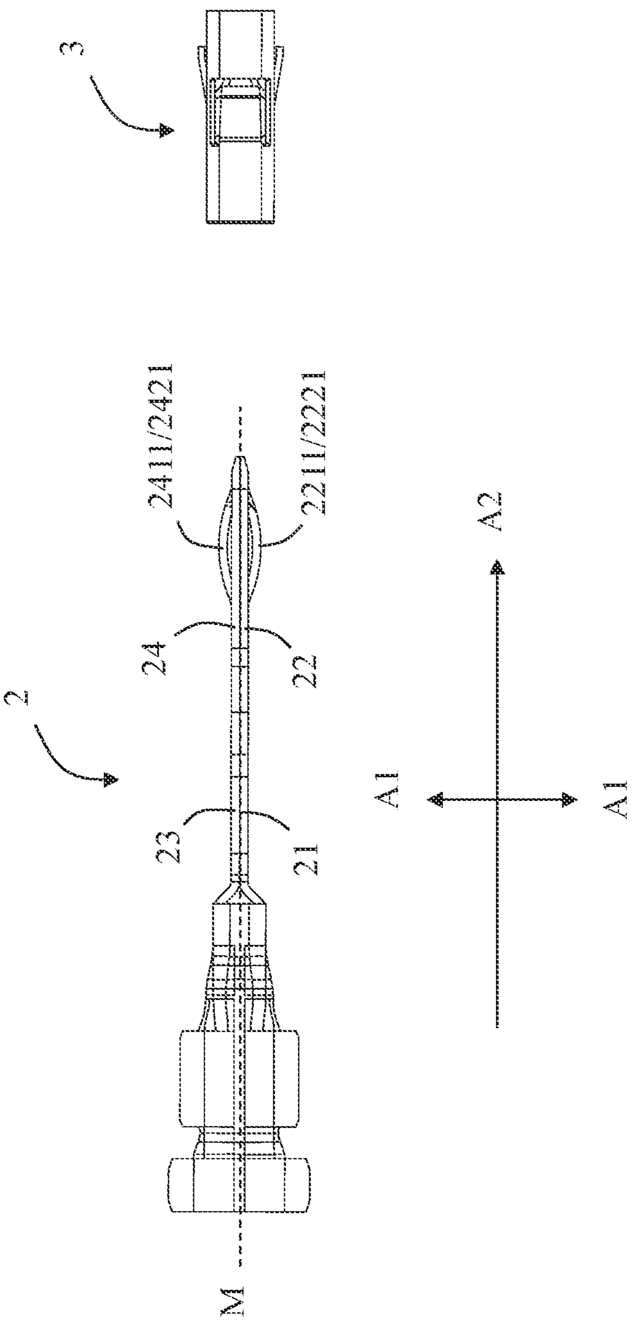
FIG. 11 is a bottom view of the conductive terminal and the retaining terminal in FIG. 6.
Figure 12:
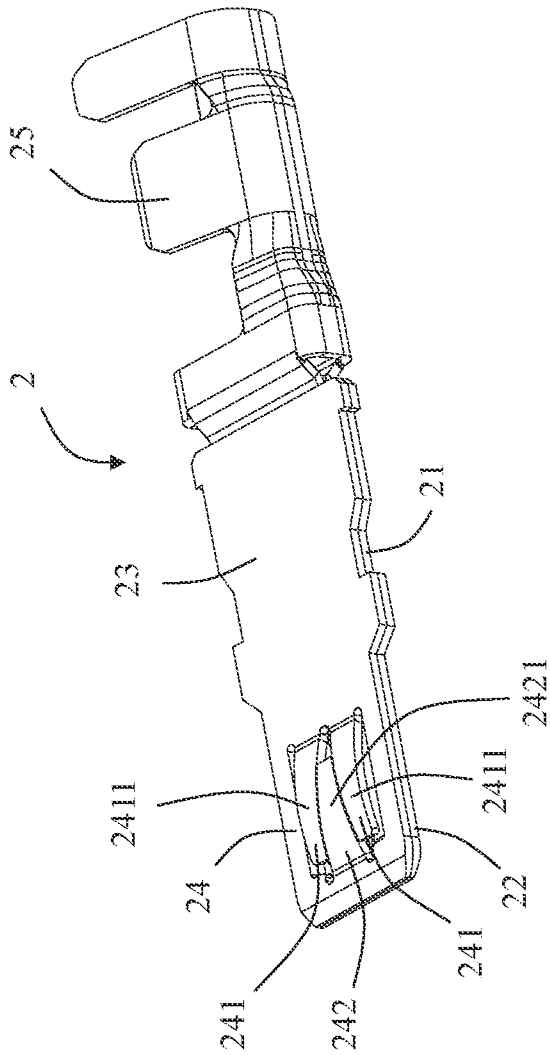
FIG. 12 is a perspective view of the conductive terminal.
Figure 13:
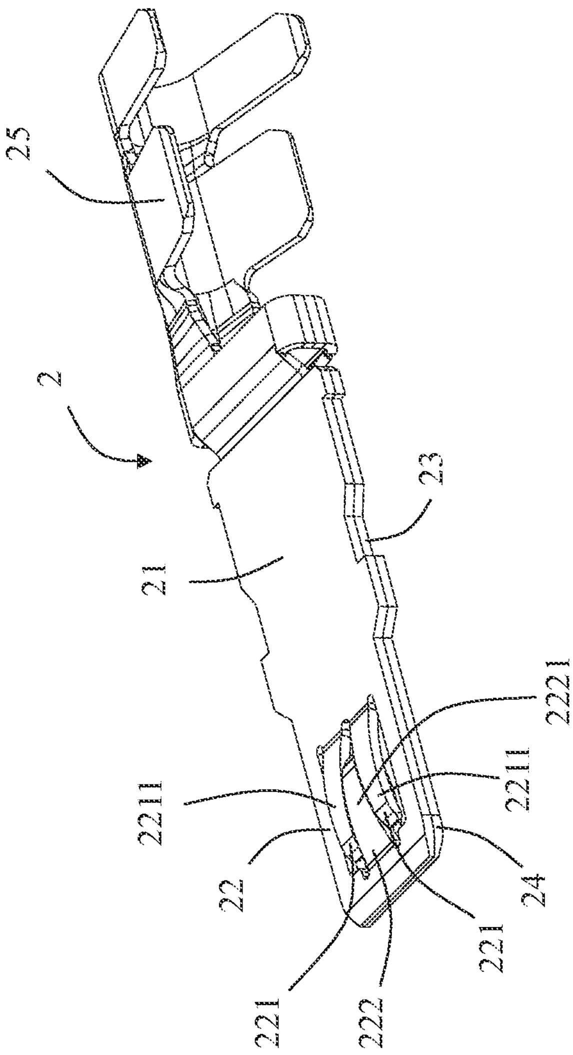
FIG. 13 is a perspective view of FIG. 12 from another angle.
Figure 14:
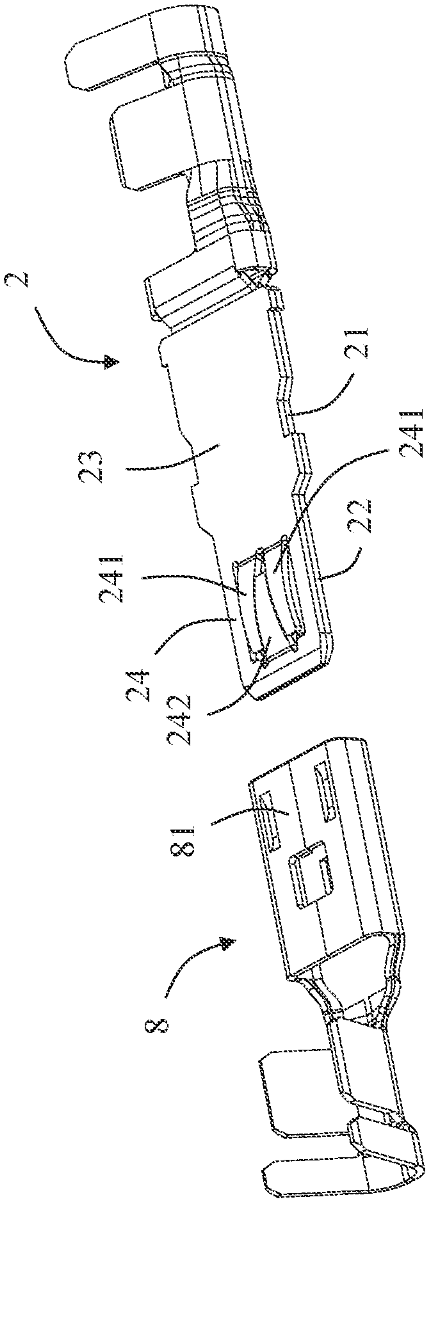
FIG. 14 is a perspective view of the conductive terminal and a mating conductive terminal before they are mated with each other.
Figure 15:
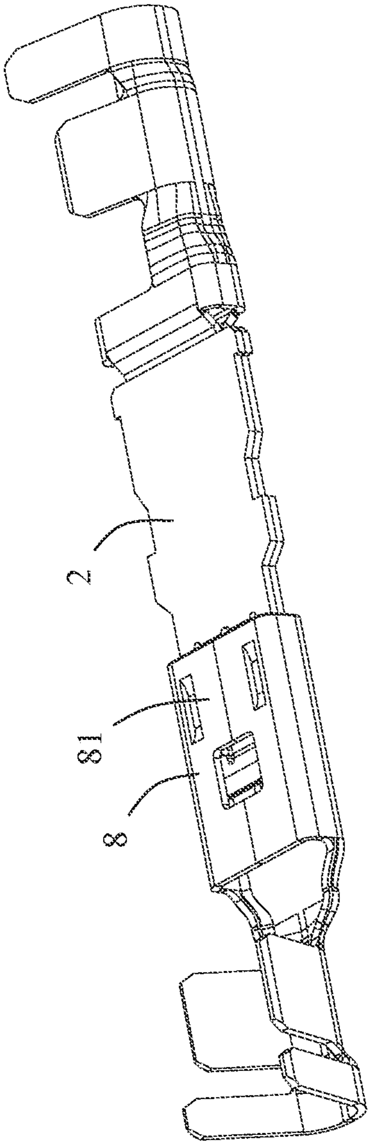
FIG. 15 is a schematic perspective view of the conductive terminal and the mating conductive terminal in FIG. 14 when they are partially mated with each other.
Figure 16:
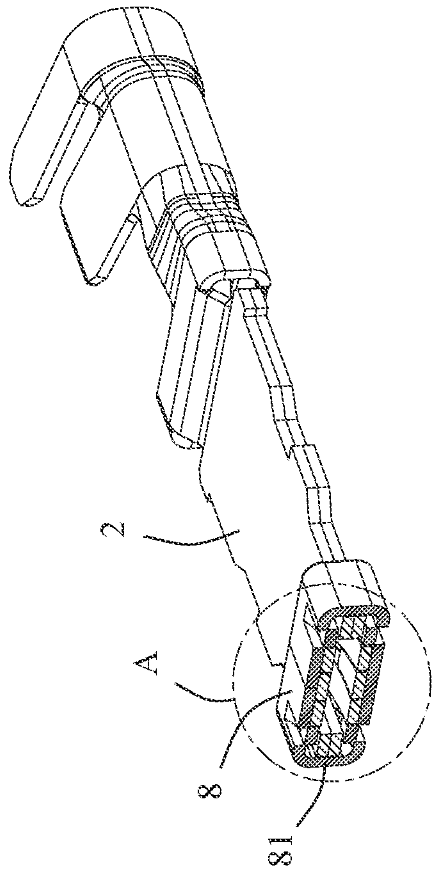
FIG. 16 is a schematic cross-sectional view of the conductive terminal and the mating conductive terminal when they are partially mated with each other.
Figure 17:
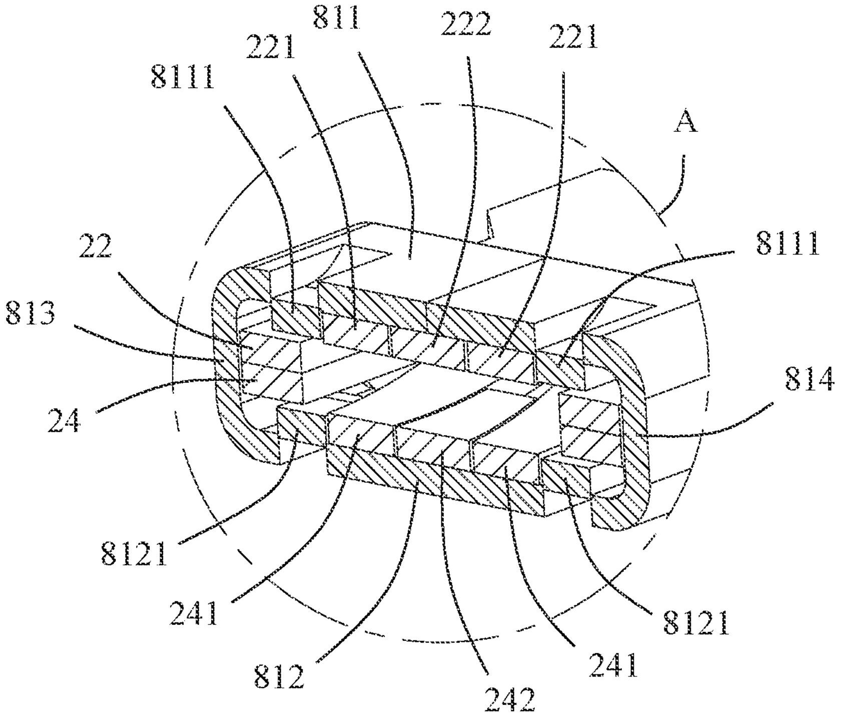
FIG. 17 is a partial enlarged view of a circled portion A in FIG. 16.
Figure 18:
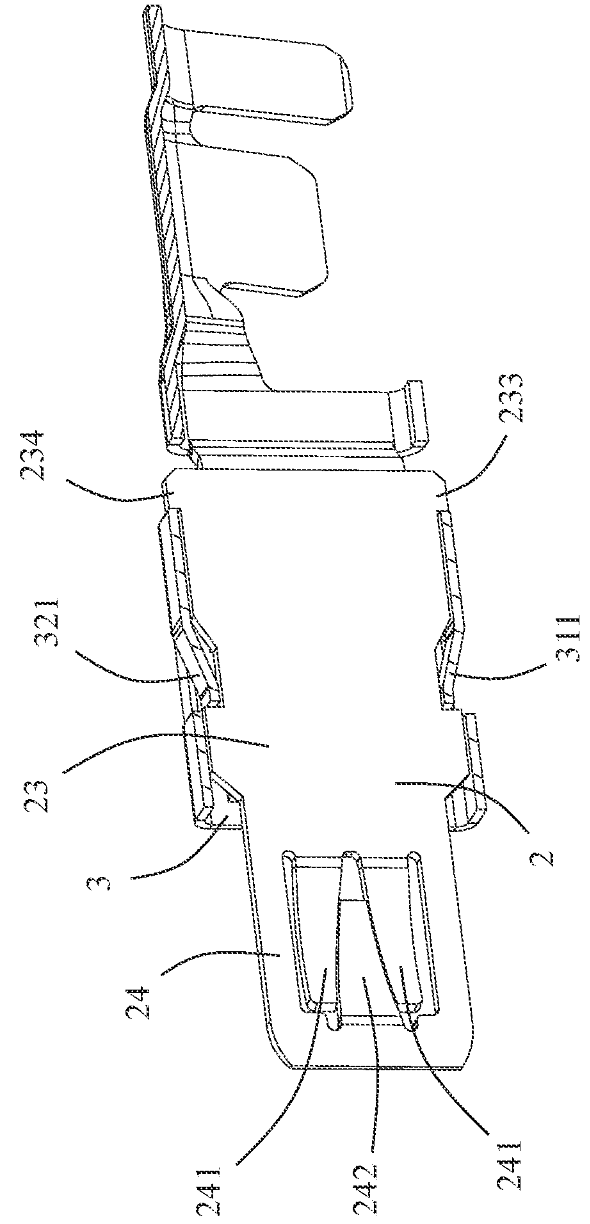
FIG. 18 is a schematic cross-sectional view of the conductive terminal and the mating conductive terminal after being mated with each other.

In the illustrated embodiment of the present disclosure, the second elastic piece 241 includes a second elastic contact portion 2411 protruding from the first fixing portion 21 along the first direction A1-A1. The second elastic contact portion 2411 extends along the second arc-shaped surface. The fourth elastic piece 242 and the second elastic piece 241 at least partially overlap along the third direction A3-A3. The fourth elastic piece 242 includes a fourth elastic contact portion 2421 protruding from the second fixing portion 23 along the first direction A1-A1. The fourth elastic contact portion 2421 extends along the second arc-shaped surface. In other words, referring to FIG. 10 and FIG. 11, the second elastic contact portion 2411 and the fourth elastic contact portion 2421 have the same arc. In this way, the second elastic piece 241 and the fourth elastic piece 242 can be held with each other and are not easily deformed; and the strokes of the two are the same. When the second elastic piece 241 and the fourth elastic piece 242 are inserted into the mating cavity 810 of the mating conductive terminal 8, the contact performance can be simultaneously achieved, and the insertion stroke is shorter. Referring to FIG. 10 and FIG. 11, in the illustrated embodiment of the present disclosure, protruding directions of the first arc-shaped surface and the second arc-shaped surface are opposite along the first direction A1-A1.

Figure 8:
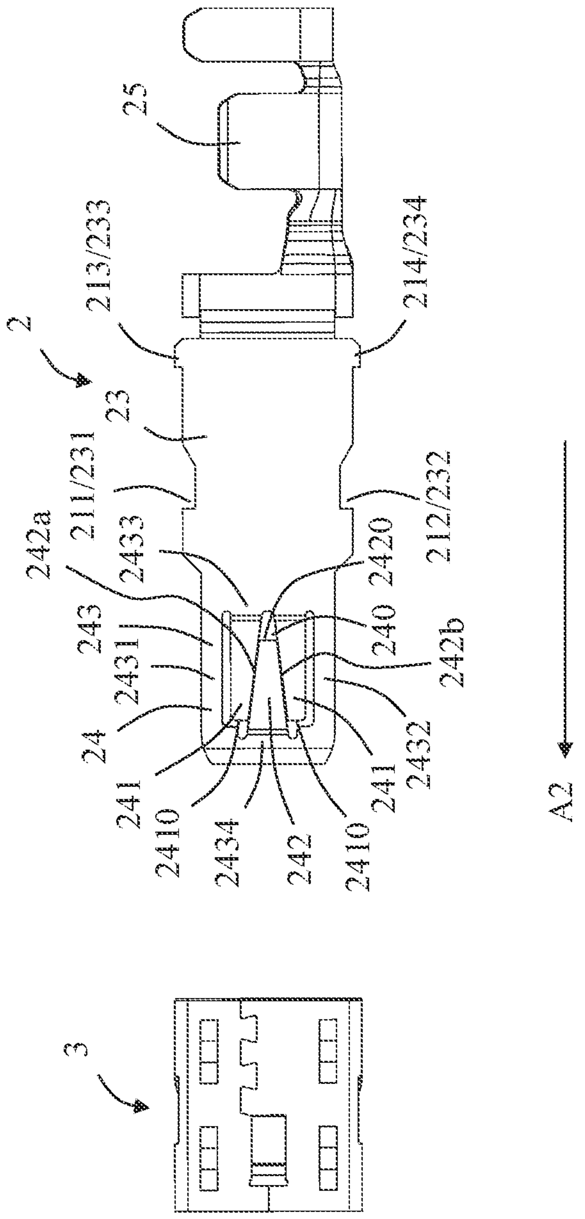
FIG. 8 is a left side view of the conductive terminal and the retaining terminal in FIG. 6.

Referring to FIG. 8, in the embodiment shown in the present disclosure, the second mating portion 24 includes a second frame portion 243. The second frame portion 243 includes a fifth wall portion 2431, a sixth wall portion 2432 opposite to the fifth wall portion 2431, a third connecting portion 2433 connecting one end of the fifth wall portion 2431 and one end of the sixth wall portion 2432, and a fourth connecting portion 2434 connecting another end of the fifth wall portion 2431 and another end of the sixth wall portion 2432. The second elastic piece 241 extends from the third connecting portion 2433 toward the fourth connecting portion 2434. The fourth elastic piece 242 extends from the fourth connecting portion 2434 toward the third connecting portion 2433. The second elastic piece 241 includes a second free end 2410 adjacent to the fourth connecting portion 2434. The fourth elastic piece 242 includes a fourth free end 2420 adjacent to the third connecting portion 2433. Both the second free end 2410 and the fourth free end 2420 are movable along the first direction A1-A1 in the second frame portion 243 due to abutment with the mating conductive terminal 8.

In the embodiment shown in the present disclosure, the second elastic piece 241 and the fourth elastic piece 242 are manufactured by tearing materials. Therefore, within the same area, the present disclosure can arrange more elastic pieces, thereby increasing the current carrying area and improving the current transmission capacity; or the present disclosure can save space under the condition of the same number of elastic pieces.

Referring to FIG. 10 and FIG. 11, in the embodiment shown in the present disclosure, the conductive terminal 2 includes a middle plane M located between the first mating portion 22 and the second mating portion 24. The first mating portion 22 and the second mating portion 24 are symmetrically arranged along the middle plane M. The first fixing portion 21 and the second fixing portion 23 are also symmetrically arranged along the middle plane M. This arrangement, on the one hand, is beneficial to save manufacturing costs; on the other hand, is advantageous to insert into the mating cavity 810 of the mating conductive terminal 8 in a symmetrical manner, so that the first mating portion 22 and the second mating portion 24 are in contact with the mating conductive terminal 8 at the same time. In the embodiment shown in the present disclosure, the conductive terminal 2 is of a one-piece configuration. That is, the conductive terminal 2 is made of a piece of metal plate. The first mating portion 22 and the second mating portion 24 are at least partially abutted against each other along the first direction A1-A1, so as to improve structural strength and facilitate transmission of high current.

The retaining terminal 3 is installed in the insulating body 1. The retaining terminal 3 is substantially in the shape of a box, and includes a first side wall 31, a second side wall 32 opposite to the first side wall 31, a third side wall 33 connecting one end of the first side wall 31 and one end of the second side wall 32, a fourth side wall 34 connecting another end of the first side wall 31 and another end of the second side wall 32, and a receiving space 30 jointly formed by the first side wall 31, the second side wall 32, the third side wall 33 and the fourth side wall 34. The first side wall 31 and the second side wall 32 are provided with a first locking arm 311 and a second locking arm 321 which protrude inwardly into the receiving space 30. The third side wall 33 and the fourth side wall 34 are provided with a first retaining elastic piece 330 and a second retaining elastic piece 340 which protrude in a direction away from the receiving space 30. Both the first retaining elastic piece 330 and the second retaining elastic piece 340 are locked with the insulating body 1. The third side wall 33 is provided with a first fixing block 331, a second fixing block 332 spaced apart from the first fixing block 331, and a first channel 333 located between the first fixing block 331 and the second fixing block 332. The fourth side wall 34 is provided with a third fixing block 341, a fourth fixing block 342 spaced apart from the third fixing block 341, and a second channel 343 located between the third fixing block 341 and the fourth fixing block 342. In the embodiment shown in the present disclosure, the first fixing block 331 and the second fixing block 332 are simply supported beams punched from the third side wall 33 into the receiving space 30. The third fixing block 341 and the fourth fixing block 342 are simply supported beams punched from the fourth side wall 34 into the receiving space 30. This arrangement, on the one hand, is convenient for manufacture. On the other hand, the structural strength of the first fixing block 331, the second fixing block 332, the third fixing block 341 and the fourth fixing block 342 can be improved. Therefore, it is beneficial to clamp the first fixing portion 21 and the second fixing portion 23 of the conductive terminal 2.

When the conductive terminal 2 is assembled to the retaining terminal 3, the conductive terminal 2 is inserted into the receiving space 30, and the first elastic piece 221 and the third elastic piece 222 pass through the first channel 333. Both the first fixing block 331 and the second fixing block 332 are pressed against the first fixing portion 21. At the same time, the second elastic piece 241 and the fourth elastic piece 242 pass through the second channel 343. Both the third fixing block 341 and the fourth fixing block 342 are pressed against the second fixing portion 23. When the conductive terminal 2 is assembled in place, the first mating portion 22 and the second mating portion 24 pass through the receiving space 30. The first locking arm 311 and the second locking arm 321 are locked in the upper locking groove and the lower locking groove, respectively. The first limiting block 213 and the second limiting block 214 are used for abutting with the first side wall 31 and the second side wall 32 to prevent the conductive terminal 2 from being over-assembled to the retaining terminal 3.

Figure 19:
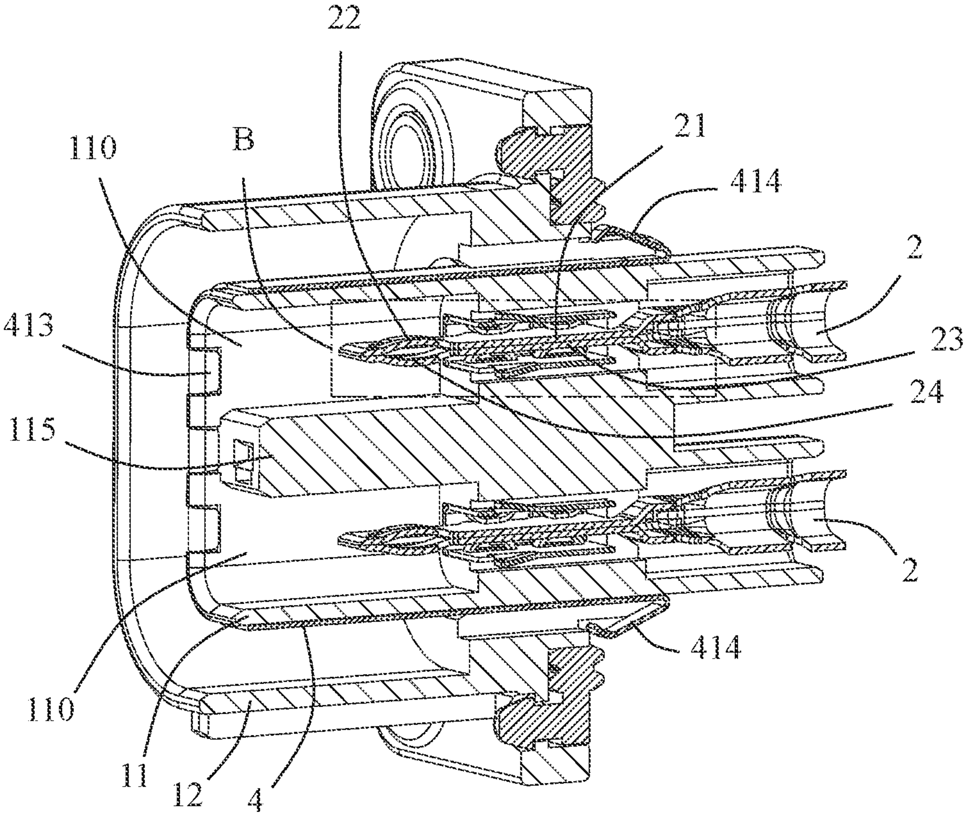
FIG. 19 is a schematic cross-sectional view of an electrical connector in accordance with an embodiment of the present disclosure.
Figure 20:
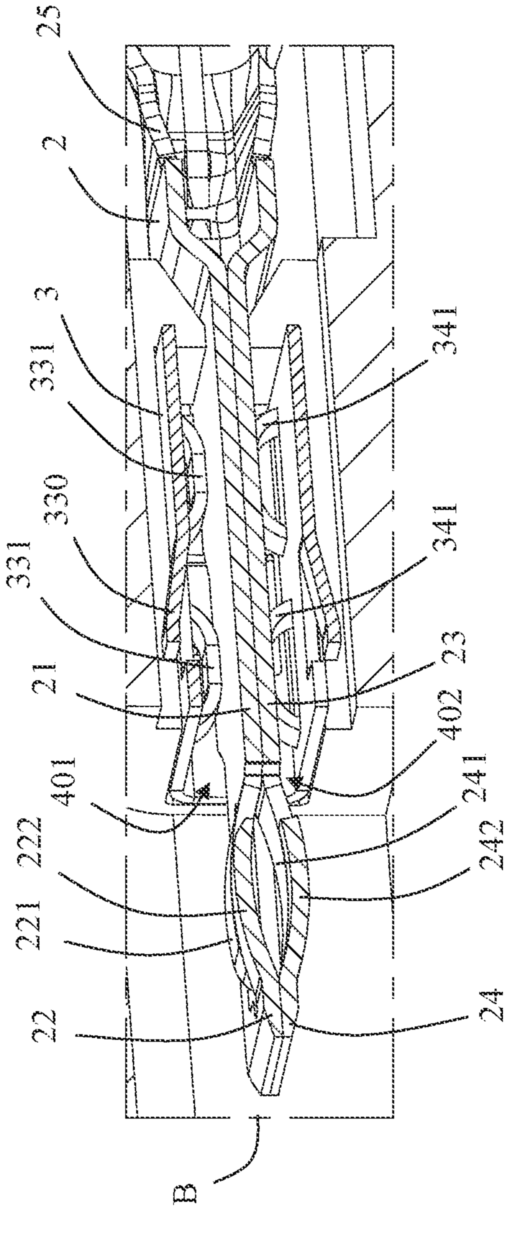
FIG. 20 is a partial enlarged view of a frame portion B in FIG. 19.

Referring to FIG. 19 and FIG. 20, after installation, the first fixing portion 21 is located adjacent to and spaced apart from the third side wall 33. The electrical connector 100 includes a first heat dissipation channel 401 located between the first fixing portion 21 and the third side wall 33. The second fixing portion 23 is located adjacent to and spaced apart from the fourth side wall 34. The electrical connector 100 includes a second heat dissipation channel 402 located between the second fixing portion 23 and the fourth side wall 34. The first heat dissipation channel 401 and the second heat dissipation channel 402 are used to allow air to circulate, so as to facilitate heat dissipation during power transmission and improve safety.

Referring to FIGS. 14 to 17, when the conductive terminal 2 is mated with the mating conductive terminal 8, the first mating portion 22 and the second mating portion 24 of the conductive terminal 2 are at least partially inserted into the mating cavity 810. Two ends (e.g., upper and lower ends) of the first butt portion 22 and the second abutment portion 24 are engaged with the first connecting wall 813 and the second connecting wall 814, respectively. That is, the first connecting wall 813 and the second connecting wall 814 function to position the first mating portion 22 and the second mating portion 24. When the conductive terminal 2 is inserted in place, the first abutting protruding ribs 8111 abut against portions of the first mating portion 22 located on two sides of the first elastic piece 221 and the third elastic piece 222. The second abutting protruding ribs 8121 abut against portions of the second mating portion 24 located on two sides of the second elastic piece 241 and the fourth elastic piece 242. The first elastic piece 221 and the third elastic piece 222 abut against an inner side of the first contact wall 811. The second elastic piece 241 and the fourth elastic piece 242 abut against an inner side of the second contact wall 812. In this way, the first mating portion 22 and the second mating portion 24 are precisely positioned in four directions of top, bottom, left, and right. As a result, the possible shaking of the conductive terminal 2 and the mating conductive terminal 8 is reduced, and the mating reliability is improved.

Compared with the prior art, in the present disclosure, the first mating portion 22 is provided with the first elastic piece 221, and the first elastic piece 221 includes a first elastic contact portion 2211 protruding from the first fixing portion 21 along the first direction A1-A1. The second mating portion 24 is provided with a second elastic piece 241, and the second elastic piece 241 includes a second elastic contact portion 2411 protruding from the second fixing portion 23 along the first direction A1-A1. The first elastic contact portion 2211 extends along the first arc-shaped surface, the second elastic contact portion 2411 extends along the second arc-shaped surface, and protruding directions of the first arc-shaped surface and the second arc-shaped surface are opposite to each other along the first direction A1-A1. Therefore, the elastic contact portions are formed on the mating portion, thereby omitting the adapter spring, and improving the structural reliability and safety.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A conductive terminal, comprising:

a first fixing portion;

a first mating portion connected with the first fixing portion;

a second fixing portion, the second fixing portion and the first fixing portion being arranged side by side and in contact with each other in a first direction; and a second mating portion connected with the second fixing portion, the second mating portion and the first mating portion being arranged side by side in the first direction;

wherein the first mating portion comprises a first elastic piece extending along a second direction, the first elastic piece comprises a first elastic contact portion protruding from the first fixing portion along the first direction;

the second mating portion comprises a second elastic piece, the second elastic piece comprises a second elastic contact portion protruding from the second fixing portion along the first direction; and the first elastic contact portion extends along a first arc-shaped surface, the second elastic contact portion extends along a second arc-shaped surface, the first arc-shaped surface protrudes away from the second arc-shaped surface; the second arc-shaped surface protrudes away from the first arc-shaped surface.

2. The conductive terminal according to claim 1, wherein the first mating portion comprises a third elastic piece extending in a direction opposite to the second direction, the third elastic piece and the first elastic piece at least partially overlap along a third direction, the third direction is perpendicular to the first direction and the second direction, the third elastic piece comprises a third elastic contact portion protruding from the first fixing portion along the first direction, and the third elastic contact portion extends along the first arc-shaped surface.

3. The conductive terminal according to claim 2, wherein two first elastic pieces are provided, the first mating portion comprises a first space located between the two first elastic pieces along the third direction, and the third elastic piece extends into the first space.

4. The conductive terminal according to claim 3, wherein the first mating portion comprises a first frame portion, the first frame portion comprises a first wall portion, a second wall portion opposite to the first wall portion, a first connecting portion connecting one end of the first wall portion and one end of the second wall portion, and a second connecting portion connecting another end of the first wall portion and another end of the second wall portion, the first elastic piece extends from the first connecting portion toward the second connecting portion, and the third elastic piece extends from the second connecting portion toward the first connecting portion.

5. The conductive terminal according to claim 4, wherein the first elastic piece comprises a first free end adjacent to the second connecting portion, the third elastic piece comprises a third free end adjacent to the first connecting portion, and both the first free end and the third free end are movable along the first direction due to abutment in the first frame portion.

6. The conductive terminal according to claim 4, wherein the second elastic piece extends along the second direction, the second mating portion comprises a fourth elastic piece extending in a direction opposite to the second direction, the fourth elastic piece and the second elastic piece at least partially overlap along the third direction, the fourth elastic piece comprises a fourth elastic contact portion protruding from the second fixing portion along the first direction, and the fourth elastic contact portion extends along the second arc-shaped surface.

7. The conductive terminal according to claim 6, wherein two second elastic pieces are provided, the second mating portion comprises a second space located between the two second elastic pieces along the third direction, and the fourth elastic piece extends into the second space.

8. The conductive terminal according to claim 7, wherein the second mating portion comprises a second frame portion, the second frame portion comprises a fifth wall portion, a sixth wall portion opposite to the fifth wall portion, a third connecting portion connecting one end of the fifth wall portion and one end of the sixth wall portion, and a fourth connecting portion connecting another end of the fifth wall portion and another end of the sixth wall portion, the second elastic piece extends from the third connecting portion toward the fourth connecting portion, the fourth elastic piece extends from the fourth connecting portion toward the third connecting portion.

9. The conductive terminal according to claim 8, wherein the second elastic piece comprises a second free end adjacent to the fourth connecting portion, the fourth elastic piece comprises a fourth free end adjacent to the third connecting portion, both the second free end and the fourth free end are movable along the first direction due to abutment in the second frame portion.

10. The conductive terminal according to claim 1, wherein the conductive terminal comprises a middle plane located in a middle of the first mating portion and the second mating portion, and the first mating portion and the second mating portion are symmetrically arranged along the middle plane.

11. The conductive terminal according to claim 1, wherein the first fixing portion and the second fixing portion are at least partially abutted against each other along the first direction, and the first mating portion and the second mating portion are at least partially abutted against each other along the first direction.

12. The conductive terminal according to claim 1, further comprising a cable riveting portion connected with the first fixing portion and the second fixing portion.

13. The conductive terminal according to claim 1, wherein the conductive terminal is of a one-piece configuration.

14. An electrical connector, comprising:
- an insulating body comprising a mating slot; and
- a conductive terminal coupled to the insulating body, the conductive terminal comprising:
  - a first fixing portion;
  - a first mating portion connected with the first fixing portion;
  - a second fixing portion, the second fixing portion and the first fixing portion being arranged side by side in a first direction; and
  - a second mating portion connected with the second fixing portion, the second mating portion and the first mating portion being arranged side by side in the first direction;
  - wherein the first mating portion comprises a first elastic piece extending along a second direction, the first elastic piece comprises a first elastic contact portion protruding from the first fixing portion along the first direction;
  - the second mating portion comprises a second elastic piece, the second elastic piece comprises a second elastic contact portion protruding from the second fixing portion along the first direction;
  - the first elastic contact portion extends along a first arc-shaped surface, the second elastic contact portion extends along a second arc-shaped surface, the first arc-shaped surface protrudes away from the second arc-shaped surface; the second arc-shaped surface protrudes away from the first arc-shaped surface;
- wherein the first fixing portion and the second fixing portion are secured in the insulating body, the first mating portion and the second mating portion extend into the mating slot.

15. The electrical connector according to claim 14, further comprising a retaining terminal mounted to the insulating body, the retaining terminal comprising a first side wall, a second side wall opposite to the first side wall, a third side wall connecting one end of the first side wall and one end of the second side wall, a fourth side wall connecting another end of the first side wall and another end of the second side wall, and a receiving space jointly enclosed by the first side wall, the second side wall, the third side wall and the fourth side wall, the first side wall and/or the second side wall being provided with a locking arm which protrudes inwardly into the receiving space, the third side wall and/or the fourth side wall being provided with a retaining elastic piece which protrudes in a direction away from the receiving space, the retaining elastic piece being locked with the insulating body, the conductive terminal being inserted into the receiving space, the first mating portion and the second mating portion extending through the receiving space, the first fixing portion and/or the second fixing portion being provided with a locking groove which is locked with the locking arm.

16. The electrical connector according to claim 15, wherein the third side wall is provided with a first fixing block, a second fixing block spaced apart from the first fixing block, and a first channel located between the first fixing block and the second fixing block;
- the fourth side wall is provided with a third fixing block, a fourth fixing block spaced apart from the third fixing block, and a second channel located between the third fixing block and the fourth fixing block;
- the first elastic piece extends through the first channel, both the first fixing block and the second fixing block are pressed against the first fixing portion; and
- the second elastic piece extends through the second channel, both the third fixing block and the fourth fixing block are pressed against the second fixing portion.

17. The electrical connector according to claim 15, wherein the first fixing portion is located adjacent to and spaced apart from the third side wall, the electrical connector comprises a first heat dissipation channel located between the first fixing portion and the third side wall;
- the second fixing portion is located adjacent to and spaced apart from the fourth side wall, the electrical connector comprises a second heat dissipation channel located between the second fixing portion and the fourth side wall.

18. The electrical connector according to claim 14, wherein the first fixing portion and the second fixing portion are at least partially abutted against each other along the first direction, and the first mating portion and the second mating portion are at least partially abutted against each other along the first direction.

19. The electrical connector according to claim 14, wherein the second fixing portion and the first fixing portion are in contact with each other in the first direction; the first arc-shaped surface protrudes away from the second arc-shaped surface; and the second arc-shaped surface protrudes away from the first arc-shaped surface.

20. An electrical connector assembly, comprising:

an electrical connector comprising:

an insulating body comprising a mating slot; and a conductive terminal coupled to the insulating body, the conductive terminal comprising:

a first fixing portion;

a first mating portion connected with the first fixing portion;

a second fixing portion, the second fixing portion and the first fixing portion being arranged side by side in a first direction; and a second mating portion connected with the second fixing portion, the second mating portion and the first mating portion being arranged side by side in the first direction;

wherein the first mating portion comprises a first elastic piece extending along a second direction, the first elastic piece comprises a first elastic contact portion protruding from the first fixing portion along the first direction;

the second mating portion comprises a second elastic piece, the second elastic piece comprises a second elastic contact portion protruding from the second fixing portion along the first direction;

the first elastic contact portion extends along a first arc-shaped surface, the second elastic contact portion extends along a second arc-shaped surface, and protruding directions of the first arc-shaped surface and the second arc-shaped surface are opposite to each other along the first direction;

the first fixing portion and the second fixing portion are secured in the insulating body, the first mating portion and the second mating portion extend into the mating slot;

wherein the insulating body comprises an annular plug portion and a casing surrounding an outer periphery of the plug portion, the plug portion defines the mating slot, the electrical connector further comprises a metal shielding sleeve sleeved on the plug portion, and the metal shielding sleeve comprises a plurality of claws extending beyond the insulating body; and a mounting plate;

wherein free ends of the claws extend through the mounting plate and abut against a back surface of the mounting plate.

* * * * *